United States Patent
Bacon-Brown et al.

(10) Patent No.: US 11,513,271 B2
(45) Date of Patent: Nov. 29, 2022

(54) REFLECTIVE WIRE GRID POLARIZER WITH TRANSPARENT CAP

(71) Applicant: Moxtek, Inc., Orem, UT (US)

(72) Inventors: Daniel Bacon-Brown, Orem, UT (US); Michael Black, Orem, UT (US); R. Stewart Nielson, Pleasant Grove, UT (US); Bradley R. Williams, Pocatello, ID (US); Benjamin Downard, Draper, UT (US); Jeffrey H. Rice, South Jordan, UT (US); Jim Pierce, Sandy, UT (US)

(73) Assignee: Moxtek, Inc., Orem, UT (US)

(*) Notice: Subject to any disclaimer, the term of this patent is extended or adjusted under 35 U.S.C. 154(b) by 375 days.

(21) Appl. No.: 16/919,513

(22) Filed: Jul. 2, 2020

(65) Prior Publication Data

US 2021/0018669 A1     Jan. 21, 2021

Related U.S. Application Data (60) Provisional application No. 62/875,093, filed on Jul. 17, 2019.

(51) Int. Cl.
  *G02B 5/30* (2006.01)
(52) U.S. Cl.
  CPC ......... *G02B 5/3058* (2013.01); *G02B 5/3075* (2013.01)
(58) Field of Classification Search
  None
  See application file for complete search history.

(56) References Cited

U.S. PATENT DOCUMENTS

| | | | |
|---|---|---|---|
| 6,243,199 B1 | 6/2001 | Hanson et al. | |
| 6,532,111 B2 | 3/2003 | Kurtz et al. | |
| 6,665,119 B1 | 12/2003 | Kurtz et al. | |
| 7,570,424 B2 | 8/2009 | Perkins et al. | |
| 7,961,393 B2 | 6/2011 | Perkins et al. | |
| 9,360,608 B2 | 6/2016 | Takahashi et al. | |
| 9,632,224 B2 | 4/2017 | Nielson et al. | |
| 10,261,359 B1* | 4/2019 | Lee .................. | G02F 1/133514 |
| 10,649,121 B2 | 5/2020 | Li et al. | |
| 2006/0039069 A1* | 2/2006 | Hayashi ............... | G02B 5/3058 359/485.05 |
| 2007/0242352 A1* | 10/2007 | MacMaster .......... | G02B 5/3058 359/485.05 |
| 2008/0316599 A1* | 12/2008 | Wang ................... | G02B 5/3058 359/485.05 |
| 2009/0066885 A1* | 3/2009 | Kumai ................. | G02B 5/3058 427/163.1 |
| 2010/0134719 A1* | 6/2010 | Johns ................... | C23C 14/205 359/485.05 |

(Continued)

FOREIGN PATENT DOCUMENTS

JP     2013130598 A   *   7/2013

*Primary Examiner* — Derek S. Chapel
(74) *Attorney, Agent, or Firm* — Thorpe, North & Western, LLP (57) ABSTRACT

A reflective wire grid polarizer (WGP) can include an array of wires 12 on a face of a substrate 11, with channels 15 between adjacent wires 12. The wires 12 can have certain characteristics for WGP performance, such as index of refraction, alternating high/low index continuous thin films, thickness of layer(s), duty cycle, reflective rib shape, a curved side of transparent ribs 21 or 32, aspect ratio, or combinations thereof.

20 Claims, 8 Drawing Sheets

(56) References Cited

U.S. PATENT DOCUMENTS

| | | | |
|---|---|---|---|
| 2012/0105745 A1* | 5/2012 | Kumai | G02B 5/3058 349/5 |
| 2013/0120672 A1* | 5/2013 | Kumai | G02F 1/1335 349/5 |
| 2016/0054497 A1* | 2/2016 | Takahashi | G02B 5/3058 216/13 |
| 2019/0271803 A1 | 9/2019 | Gao | |
| 2020/0174173 A1 | 6/2020 | George | |
| 2020/0355860 A1* | 11/2020 | Shibuya | G02F 1/133548 |
| 2020/0371277 A1* | 11/2020 | Oowada | G02F 1/1335 |

* cited by examiner

REFLECTIVE WIRE GRID POLARIZER WITH TRANSPARENT CAP

CLAIM OF PRIORITY

This application claims priority to U.S. Provisional Patent Application No. 62/875,093, filed on Jul. 17, 2019, which is incorporated herein by reference.

FIELD OF THE INVENTION

The present application is related generally to reflective wire grid polarizers.

BACKGROUND

A wire grid polarizer (WGP) can divide light into two different polarization states. One polarization state can primarily pass through the WGP and the other polarization state can be primarily absorbed or reflected. The effectiveness or performance of WGPs is based on high transmission of a predominantly-transmitted polarization (sometimes called Tp) and minimal transmission of an opposite polarization (sometimes called Ts).

Typically, a change in WGP structure to increase Tp will also increase Ts, and a change in WGP structure to decrease Ts will also decrease Tp. Therefore, some WGPs are designed for high Tp and others designed for low Ts.

It can be beneficial to have high contrast (Tp/Ts). Contrast can be increased by increasing transmission of the predominantly-transmitted polarization (e.g. increasing Tp) and by decreasing transmission of the opposite polarization (e.g. decreasing Ts).

Particularly if the reflected light beam will be used, it can be important to have a very low reflection (e.g. low Rp) of the primarily transmitted polarization. The percent reflection of the opposite polarization (Rs) can also be a useful indicator of polarizer performance.

SUMMARY

It has been recognized that it would be advantageous to improve wire grid polarizer (WGP) performance, including increasing transmission of a predominantly-transmitted polarization (e.g. increasing Tp), decreasing transmission of an opposite polarization (e.g. decreasing Ts), increasing contrast (e.g. Tp/Ts), and low reflection (e.g. low Rp) of the predominantly-transmitted polarization state. The present invention is directed to various embodiments of WGPs that satisfy these needs. Each embodiment may satisfy one, some, or all of these needs.

BRIEF DESCRIPTION OF THE DRAWINGS (DRAWINGS MIGHT NOT BE DRAWN TO SCALE)

DEFINITIONS

The following definitions, including plurals of the same, apply throughout this patent application.

As used herein, the term "adjoin" means direct and immediate contact. As used herein, the term "adjacent" includes adjoin, but also includes near or next to with other solid material(s) between the adjacent items.

As used herein, the phrase "consist essentially of", and related phrases such as "consists essentially of" or "consisting essentially of", with regard to wire structure, mean that the wire includes the thin film(s) mentioned, but no other thin film(s) for optical performance. The wire can, however, also include impurities or coatings for protection such as from corrosion or oxidation. Substrate ribs beneath the wires are not included in the wire for the purpose of this definition.

As used herein, the term "elongated" means that a length L of the wires 12 is substantially greater than wire width $W_{12}$ or wire thickness $Th_{12}$ (e.g. L can be ≥10 times, ≥100 times, ≥1000 times, or ≥10,000 times larger than wire width $W_{12}$ and/or wire thickness $Th_{12}$). See FIG. 2.

As used herein, the term "mm" means millimeter(s) and the term "nm" means nanometer(s).

As used herein, the term "parallel" means exactly parallel, or substantially parallel, such that planes or vectors associated with the devices in parallel would intersect with an angle of ≤20°. Intersection of such planes or vectors can be ≤2°, ≤5°, or ≤10° if explicitly so stated.

As used herein, the term "aluminum oxide" includes $Al_2O_3$ and other combinations of aluminum and oxygen, including nonstoichiometric combinations; hafnium oxide includes $HfO_2$ and other combinations of hafnium and oxygen, including nonstoichiometric combinations; silicon dioxide includes $SiO_2$ and other combinations of silicon and oxygen, including nonstoichiometric combinations, and titanium dioxide includes $TiO_2$ and other combinations of titanium and oxygen, including nonstoichiometric combinations.

As used herein, the term "substrate" means a base material, such as for example a glass wafer. Unless specified otherwise in the claims, the term "substrate" also includes any continuous thin film(s) sandwiched between the glass wafer and the wires of the polarizer. The substrate can be thick in an optical sense, meaning substantially thicker than a maximum wavelength of light in the wavelength range of use, if explicitly so stated in the claims. For example, a thickness $Th_{11}$ of the substrate can be ≥0.1 mm, ≥0.35 mm, or ≥0.6 mm.

As used herein, the term "ultraviolet spectrum" means ≥10 nm & <400 nm, the term "visible spectrum" means ≥400 nm & <700 nm, and the term "infrared spectrum" means ≥700 nm & ≤1 mm.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a wavelength range of intended use, across the ultraviolet spectrum, across the visible spectrum, across the infrared spectrum, or combinations thereof, and can have a different property in a different wavelength range. Thus, whether a material is absorptive, reflective, or transparent is dependent on the intended wavelength range of use. Materials are divided into absorptive, reflective, and transparent based on reflectance R, the real part of the refractive index n, and the imaginary part of the refractive index/extinction coefficient k. Equation 1 is used to determine the reflectance R of the interface between air and a uniform slab of the material at normal incidence:

$$R = \frac{(n-1)^2 + k^2}{(n+1)^2 + k^2} \quad \text{Equation 1}$$

Unless explicitly specified otherwise herein, materials with k≤0.1 in the wavelength range are "transparent" materials, materials with k>0.1 and R≤0.6 in the specified wavelength range are "absorptive" materials, and materials with k>0.1 and R>0.6 in the specified wavelength range are "reflective" materials. If explicitly so stated in the claims, materials with k>0.1 and R≥0.7, R≥0.8, or R≥0.9, in the specified wavelength range, are "reflective" materials.

Unless explicitly noted otherwise herein, all temperature-dependent values are such values at 25° C.

DETAILED DESCRIPTION

The following embodiments of reflective wire grid polarizers (WGPs) can be optimized as described herein for performance, including a high transmission of a predominantly-transmitted polarization (e.g. high Tp), minimal transmission of an opposite polarization (e.g. low Ts), high contrast (e.g. high Tp/Ts), low reflection of the primarily transmitted polarization (e.g. low Rp), high reflection of the opposite polarization (e.g. high Rs), or combinations thereof. For most of the WGP characteristics described below, it is the combination of such characteristics that provides the desired benefit, and not the individual characteristic alone.

Low Rp

The WGP characteristics described in the following paragraphs of this Low Rp section and illustrated in FIGS. 1 and 3, particularly combinations of these characteristics, can be particularly useful for reducing reflection of the primarily transmitted polarization (e.g. for low Rp). Embodiments of WGPs with these characteristics have shown a reduction of Rp down to about 10% of what was previously possible.

Figure 1:
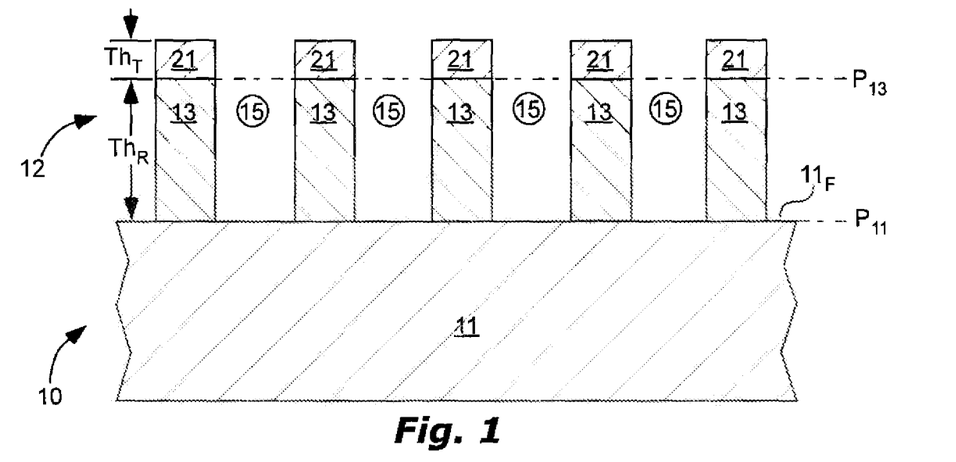
FIG. 1 is a schematic, cross-sectional side-view of a reflective wire grid polarizer (WGP) 10, comprising an array of wires 12 on a face $11_F$ of a substrate 11, with channels 15 between adjacent wires 12, each wire 12 including a reflective rib 13 sandwiched between a transparent rib 21 and the substrate 11, in accordance with an embodiment of the present invention.

As illustrated in FIG. 1, a reflective WGP 10 is shown comprising an array of wires 12 on a face $11_F$ of a substrate 11, with channels 15 between adjacent wires. The array of wires 12 can be parallel and elongated. Each wire 12 of the array can include a reflective rib 13 and a transparent rib 21. The reflective rib 13 can be sandwiched between the transparent rib 21 and the substrate 11.

The reflective rib 13 can have a thickness ($Th_R$), measured perpendicular to the face $11_F$ of the substrate 11, for improved WGP 10 performance, particularly for reduced Rp. For example, $Th_R$≥90 nm, $Th_R$≥100 nm, $Th_R$≥104 nm, $Th_R$≥107 nm, $Th_R$≥108 nm, or $Th_R$≥114 nm; and $Th_R$≤114 nm, $Th_R$≤116 nm, $Th_R$≤117 nm, $Th_R$≤125 nm, or $Th_R$≤140 nm.

The transparent rib 21 can have a thickness ($Th_T$), measured perpendicular to the face $11_F$ of the substrate 11, for WGP 10 performance, particularly for reduced Rp. For example, $Th_T \geq 4$ nm, $Th_T \geq 7$ nm, $Th_T \geq 10$ nm, $Th_T \geq 11$ nm, $Th_T \geq 12$ nm, or $Th_T \geq 14$ nm; and $Th_T \leq 14$ nm, $Th_T \leq 16$ nm, $Th_T \leq 17$ nm, $Th_T \leq 21$ nm, $Th_T \leq 30$ nm, $Th_T \leq 40$ nm, or $Th_T \leq 50$ nm.

The array of wires 12 can have a duty cycle (DC) for WGP 10 performance, particularly for reduced Rp. For example, $DC \geq 0.35$, $DC \geq 0.39$, $DC \geq 0.42$, or $DC \geq 0.43$; and $DC \leq 0.44$, $DC \leq 0.45$, $DC \leq 0.46$, $DC \leq 0.47$, $DC \leq 0.49$, or $DC \leq 0.55$. DC equals wire width $W_{12}$ divided by pitch P of the array of wires 12, both pitch P and width $W_{12}$ measured at a midpoint between an end of the wires 12 closest to the substrate 11 and an end of the wires 12 farthest from the substrate 11 (see FIG. 2).

As illustrated in FIG. 1, the reflective rib 13 can adjoin the transparent rib 21, can adjoin the substrate 11, or both. Also, as illustrated in FIG. 1, each wire 12 can consist essentially of the reflective rib 13 and the transparent rib 21. A surface of the transparent rib 21 not facing the reflective rib 13 can be exposed to air, covered by a material having a thickness of ≤15 nm, or both.

Figure 3:
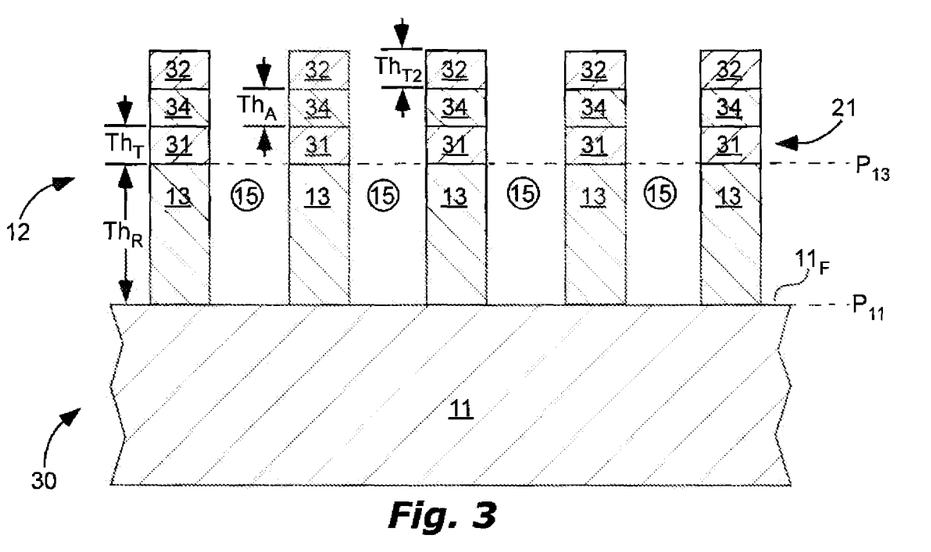
FIG. 3 is a schematic, cross-sectional side-view of a reflective WGP 30, comprising an array of wires 12 on a face $11_F$ of a substrate 11, with channels 15 between adjacent wires 12, each wire 12 including the following layers in the following order from closest to the substrate 11 to farthest from the substrate 11: a reflective rib 13, a first transparent rib 31, an absorptive rib 34, and a second transparent rib 32, in accordance with an embodiment of the present invention.

As illustrated in FIG. 3, reflective WGP 30 includes an array of wires 12 on a substrate 11. The wires 12 of WGP 30 can include the following layers in the following order from closest to the substrate 11 to farthest from the substrate 11: a reflective rib 13, a first transparent rib 31, an absorptive rib 34, and a second transparent rib 32. Although an absorptive rib 34 is used in this structure, it is still a reflective WGP and the polarization state not transmitted is predominantly reflected. The absorptive rib 34 can reduce transmission of the predominantly-reflected polarization (e.g. reduce Ts).

The reflective rib 13 can have a thickness ($Th_R$), measured perpendicular to the face $11_F$ of the substrate 11, for WGP 30 performance, particularly for reduced Rp. For example, $Th_R \geq 80$ nm, $Th_R \geq 95$ nm, $Th_R \geq 105$ nm, $Th_R \geq 114$ nm, $Th_R \geq 115$ nm, or $Th_R \geq 123$ nm; and $Th_R \leq 123$ nm, $Th_R \leq 135$ nm, $Th_R \leq 136$ nm, $Th_R \leq 155$ nm, or $Th_R \leq 170$ nm.

The first transparent rib 31 can have a thickness ($Th_T$), measured perpendicular to the face $11_F$ of the substrate 11, for WGP 30 performance, particularly for reduced Rp. For example, $Th_T \geq 0.05$ nm, $Th_T \geq 0.1$ nm, $Th_T \geq 0.5$ nm, or $Th_T \geq 1$ nm; and $Th_T \leq 1$ nm, $Th_T \leq 2$ nm, $Th_T \leq 3$ nm, $Th_T \leq 5$ nm, or $Th_T \leq 10$ nm. The first transparent rib 31 can be helpful for WGP performance. The first transparent rib 31 can also provide a barrier between the reflective rib 13 and the absorptive rib 34, to avoid migration of atoms from the absorptive rib 34 from combining with atoms in the reflective rib 13.

The absorptive rib 34 can have a thickness ($Th_A$), measured perpendicular to the face $11_F$ of the substrate 11, for WGP 30 performance, particularly for reduced Rp. For example, $Th_A \geq 0.1$ nm, $Th_A \geq 0.5$ nm, $Th_A \geq 0.9$ nm, $Th_A \geq 1$ nm, $Th_A \geq 1.5$ nm, or $Th_A \geq 1.6$ nm; and $Th_A \leq 1.6$ nm, $Th_A \leq 2$ nm, $Th_A \leq 3$ nm, $Th_A \leq 4$ nm, $Th_A \leq 8$ nm, or $Th_A \leq 15$ nm.

The second transparent rib 32 can have a thickness ($Th_{T2}$), measured perpendicular to the face $11_F$ of the substrate 11, for WGP 30 performance, particularly for reduced Rp. For example, $Th_{T2} \geq 3$ nm, $Th_{T2} \geq 6$ nm, $Th_{T2} \geq 7$ nm, $Th_{T2} \geq 8$ nm, $Th_{T2} \geq 10$ nm, or $Th_{T2} \geq 13$ nm; and $Th_{T2} \leq 15$ nm, $Th_{T2} \leq 19$ nm, $Th_{T2} \leq 20$ nm, or $Th_{T2} \leq 30$ nm.

The array of wires 12 can have a duty cycle (DC) for WGP 30 performance, particularly for reduced Rp. For example, $DC \geq 0.35$, $DC \geq 0.41$, $DC \geq 0.43$, or $DC \geq 0.44$; and $DC \leq 0.44$, $DC \leq 0.45$, $DC \leq 0.46$, $DC \leq 0.47$, $DC \leq 0.48$, or $DC \leq 0.55$. DC equals wire width $W_{12}$ divided by pitch P of the array of wires 12, both pitch P and width $W_{12}$ measured at a midpoint between an end of the wires 12 closest to the substrate 11 and an end of the wires 12 farthest from the substrate 11 (see FIG. 2).

As illustrated in FIG. 3, the reflective rib 13 can adjoin the first transparent rib 31, the substrate 11, or both. The absorptive rib 34 can adjoin the first transparent rib 31, the second transparent rib 32, or both. Also, as illustrated in FIG. 3, each wire 12 can consist essentially of the reflective rib 13, the first transparent rib 31, the absorptive rib 34, and the second transparent rib 32.

A shape of each wire 12 can be adjusted for WGP performance, such as increased Tp, to facilitate manufacturing, or both. For example, each wire 12 of WGPs 10 or 30 can further comprise taper angle A of sidewalls $13_S$ of the reflective rib 13, multiple widths $W_{13}$ of the reflective rib 13 including narrow section(s) 51 and wide section(s) 52, the reflective rib 13 having a flat side $13_F$, the transparent rib 21 having a curved side $21_C$, the second transparent rib 32 having a curved side $32_C$, high aspect ratio (AR), air-filled channels, or combinations thereof, as described with other embodiments herein. The rib thicknesses and wire duty cycles of WGPs 10 or 30 can be applied to any of the other WGP embodiments described herein. WGPs 10 and 30 can be useful for WGP performance, particularly low Rp.

WGP with Reflective Rib Taper Angle

Figure 4:
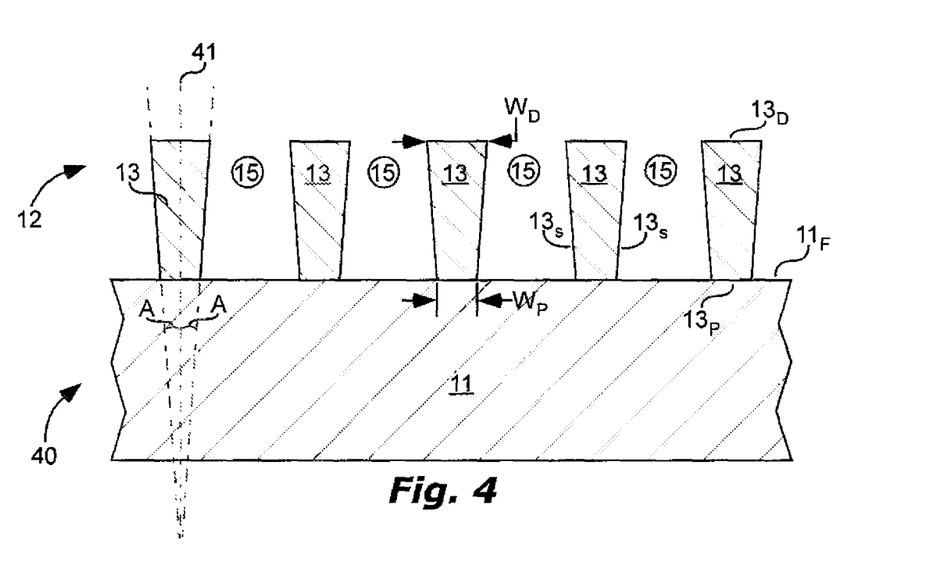
FIG. 4 is a schematic, cross-sectional side-view of a reflective WGP 40, similar to other WGPs herein, but further comprising the reflective rib 13 is wider at a distal end $13_D$ farthest from the substrate 11 than at a proximal end $13_P$ closest to the substrate 11, in accordance with an embodiment of the present invention.

As illustrated in FIG. 4, reflective WGP 40 can include an array of wires 12 on a face $11_F$ of a substrate 11, with channels 15 between adjacent wires. Each wire 12 can include a reflective rib 13. The reflective rib 13 can be wider at a distal end $13_D$ farthest from the substrate 11 than at a proximal end $13_P$ closest to the substrate 11. Thus, the rib can be shaped for WGP performance, such as to increase Tp, or to facilitate manufacturing.

A taper angle A of sidewalls $13_S$ of the reflective rib 13, relative to a plane 41 perpendicular to the face $11_F$ of a substrate 11 and parallel with the array of wires, can include one or more of the following values: taper angle ≥0.3°, taper angle ≥0.5°, taper angle ≥0.1°, taper angle ≥1.2°, taper angle ≥1.5°, taper angle ≥2°, or taper angle ≥3°; and taper angle ≤3°, taper angle ≤4°, taper angle ≤5°, taper angle ≤6°, or taper angle ≤10°.

Each wire 12 of WGP 40 can further comprise thickness $Th_R$ of the reflective rib 13; transparent rib(s) 21, 31, 32; thicknesses $Th_T$ and $Th_{T2}$ of the transparent ribs 21, 31, and 32; an absorptive rib 34; thickness $Th_A$ of the absorptive rib 34; the reflective rib 13 having a flat side $13_F$; the transparent rib 21 having a curved side $21_C$; the second transparent rib 32 having a curved side $32_C$; high aspect ratio (AR); air-filled channels; or combinations thereof, as described with other embodiments herein. The shape of the reflective rib 13 of WGP 40 can be applied to any of the other WGP embodiments described herein. WGP 40 can be useful for WGP performance, particularly low Rp.

WGP with Multiple Width Reflective Rib

Figure 5A:
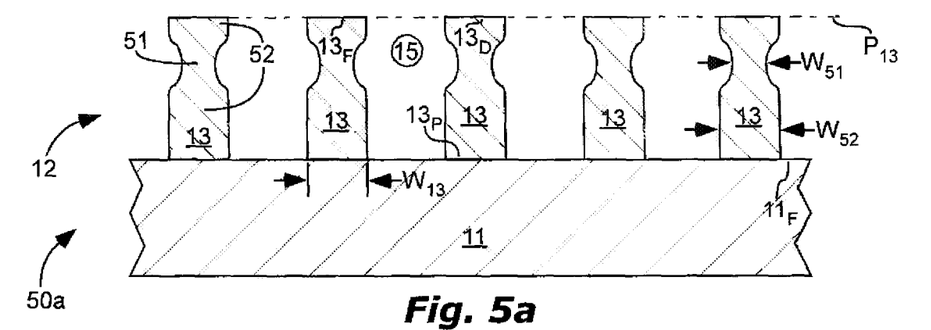
FIGS. 5a-b are schematic, cross-sectional side-views of reflective WGPs 50a and 50b, illustrating multiple widths $W_{13}$ of the reflective rib 13, including narrow section(s) 51 and wide section(s) 52, in accordance with embodiments of the present invention.
Figure 5B:
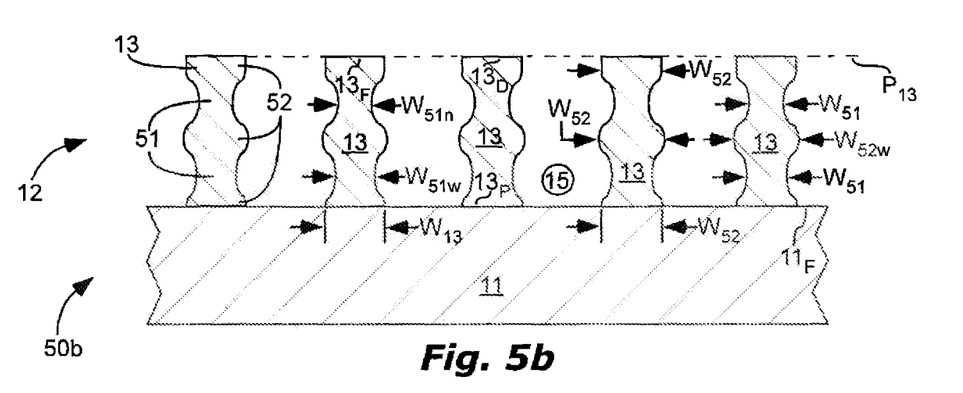

As illustrated in FIGS. 5a and 5b, reflective WGPs 50a and 50b can include an array of wires 12 on a face $11_F$ of a substrate 11, with channels 15 between adjacent wires. Each wire 12 can include a reflective rib 13. The reflective rib 13 can have multiple widths $W_{13}$, including narrow section(s) 51 and wide section(s) 52. The wide sections 52 and the narrow sections 51 can alternate.

As illustrated in FIG. 5a, the reflective rib 13 can including a single narrow section 51 and two wide sections 52. Following are example relationships of these widths for WGP performance. A width ($W_{51}$) of the narrow section 51 divided by a width ($W_{52}$) of the wide section 52 can be within the following range: $W_{51}/W_{52} \geq 0.40$, $W_{51}/W_{52} \geq 0.48$, $W_{51}/W_{52} \geq 0.55$, or $W_{51}/W_{52} \geq 0.65$; and $W_{51}/W_{52} \leq 0.65$, $W_{51}/W_{52} \leq 0.75$, or $W_{51}/W_{52} \leq 0.85$. Although not shown in FIG. 5a, the reflective rib 13 can including a single narrow section 51 and a single wide section 52.

As illustrated in FIG. 5b, the reflective rib 13 can including two narrow sections 51 and three wide sections 52. The two narrow sections 51 can be separated from each other by one of the three wide sections 52. Two of the three wide sections 52, not between the two narrow sections 51, can be located at outer ends (proximal end 13$_P$ and distal end 13D) of the reflective rib 13. The WGP can include more narrow sections 51 and more wide sections 52 than is illustrated in FIG. 5b.

Following are example relationships of these widths for WGP 50b performance. A width ($W_{51w}$) of a wider of the narrow sections 51 divided by a width ($W_{52w}$) of a widest of the wide sections 52 can be within the following range: $W_{51w}/W_{52w} \geq 0.40$, $W_{51w}/W_{52w} \geq 0.55$, or $W_{51w}/W_{52w} \geq 0.65$; and $W_{51w}/W_{52w} \leq 0.65$, $W_{51w}/W_{52w} \leq 0.75$, or $W_{51w}/W_{52w} \leq 0.85$. A width ($W_{51n}$) of a narrower of the narrow sections 51 divided by a width ($W_{52w}$) of a widest of the wide sections 52 can be within the following range: $W_{51w}/W_{52w} \geq 0.40$, $W_{51w}/W_{52w} \geq 0.48$, $W_{51w}/W_{52w} \geq 0.58$, or $W_{51w}/W_{52w} \geq 0.68$; and $W_{51w}/W_{52w} \leq 0.68$, $W_{51w}/W_{52w} \leq 0.75$, or $W_{51w}/W_{52w} \leq 0.85$.

The following relationships of widths ($W_{51}$) of the narrow sections can be useful for increasing transmission of the predominantly-transmitted polarization (e.g. increasing Tp), decreasing transmission of the opposite polarization (e.g. decreasing Ts), and improving durability of WGP 50b: $W_{51n}/W_{51w} \geq 0.67$, $W_{51n}/W_{51w} \geq 0.77$, or $W_{51n}/W_{51w} \geq 0.85$; and $W_{51n}/W_{51w} \leq 0.85$, $W_{51n}/W_{51w} \leq 0.90$, or $W_{51n}/W_{51w} \leq 0.97$.

The narrow section 51 nearest the distal end 13$_D$ of WGP 50a or WGP 50b can increase transmission of the predominantly-transmitted polarization (e.g. increase Tp). The second wide section 52 from the distal end 13$_D$ of WGP 50a or WGP 50b can improve durability of the wires 12. The narrow section 51 nearest the proximal end 13$_P$ of WGP 50b can improve performance at lower light wavelengths.

The multiple widths $W_{13}$ described above can be accomplished by injecting more nitrogen gas with the etch chemistry during etch of the wider section(s) and less nitrogen gas during etch of the narrower section(s). In theory, the nitrogen combines with chemistry of the resist to form a protective layer on sidewalls of the aluminum.

Each wire 12 of WGPs 50a or 50b can further comprise thickness Th$_R$ of the reflective rib 13; transparent rib(s) 21, 31, 32; thicknesses Th$_T$ and Th$_{T2}$ of the transparent ribs 21, 31, and 32; an absorptive rib 34; thickness Th$_A$ of the absorptive rib 34; the reflective rib 13 having a flat side 13$_F$; the transparent rib 21 having a curved side 21$_C$; the second transparent rib 32 having a curved side 32$_C$; high aspect ratio (AR); air-filled channels; or combinations thereof, as described with other embodiments herein. The shape of the reflective rib 13 of WGPs 50a or 50b can be applied to any of the other WGP embodiments described herein. WGPs 50a or 50b can be useful for WGP performance, particularly high Tp and low Ts.

WGP with a Flat Reflective Rib, a Rounded Transparent Cap, or Both

Typically, a change in WGP structure to increase Tp will increase Ts, and a change in WGP structure to decrease Ts will decrease Tp. WGP designers normally must choose between increasing Tp or decreasing Ts. Therefore, some WGPs are designed for high Tp and others designed for low Ts. The WGP characteristics of this section, particularly combinations of these characteristics, and illustrated in FIGS. 6a and 6b, have increased Tp and decreased Ts.

As illustrated in FIGS. 1, 3, 5a-6b, and 14, a distal end 13$_D$ (farthest from the substrate 11) of the reflective rib 13 can include a flat side 13$_F$. The flat side 13r can face the transparent rib 21 (if used). The flat side 13$_F$ of the reflective rib 13 can be parallel to the face 11$_F$ of the substrate 11 (i.e. plane P$_{13}$ of the flat side 13$_F$ of the reflective rib 13 is parallel to the plane P$_{11}$ of the face 11$_F$ of the substrate 11). Such flat side 13$_F$ can be useful for WGP performance, particularly for high Tp and low Ts, and can result from the method of making as described below. The transparent rib 21 can have a flat side 21$_F$ facing the flat side 13$_F$ of the reflective rib 13. The second transparent rib 32 can have a flat side 32$_F$ facing the flat side 13$_F$ of the reflective rib 13. The flat side 13$_F$ of the reflective rib 13, the flat side 21$_F$ of the transparent rib 21, the flat side 32$_F$ of the second transparent rib 32, or combinations thereof, can apply to any embodiment described herein.

Figure 6A:
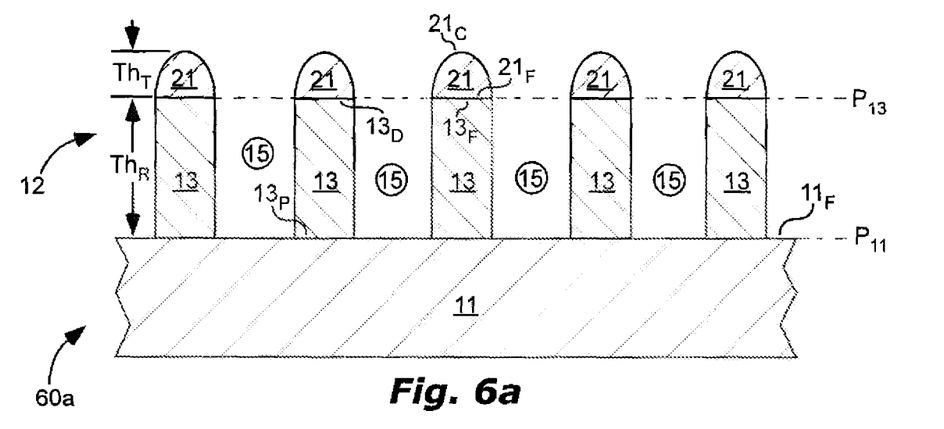
FIG. 6a is a schematic, cross-sectional side-view of reflective WGP 60a, similar to WGP 10, but further comprising the transparent rib 21 having a curved side $21_C$, in accordance with an embodiment of the present invention.
Figure 6B:
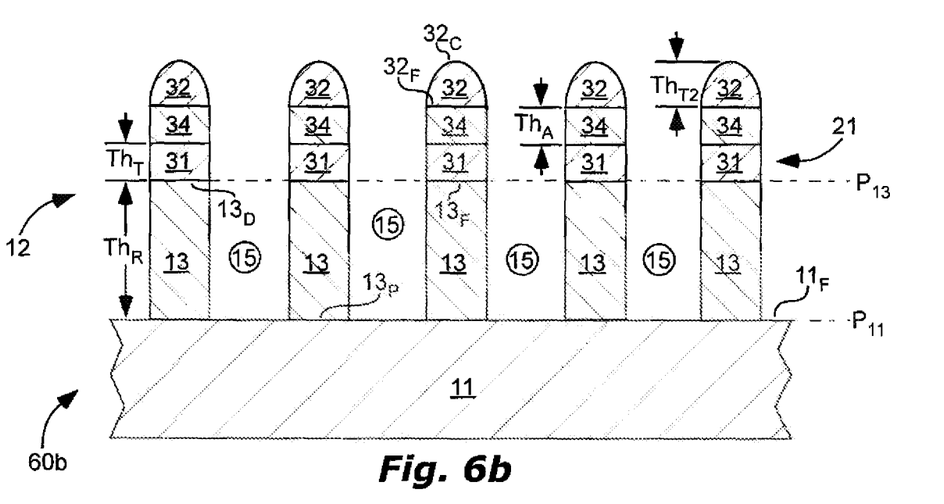
FIG. 6b is a schematic, cross-sectional side-view of reflective WGP 60b, similar to WGP 30, but further comprising the second transparent rib 32 having a curved side $32_C$, in accordance with an embodiment of the present invention.
Figure 13:
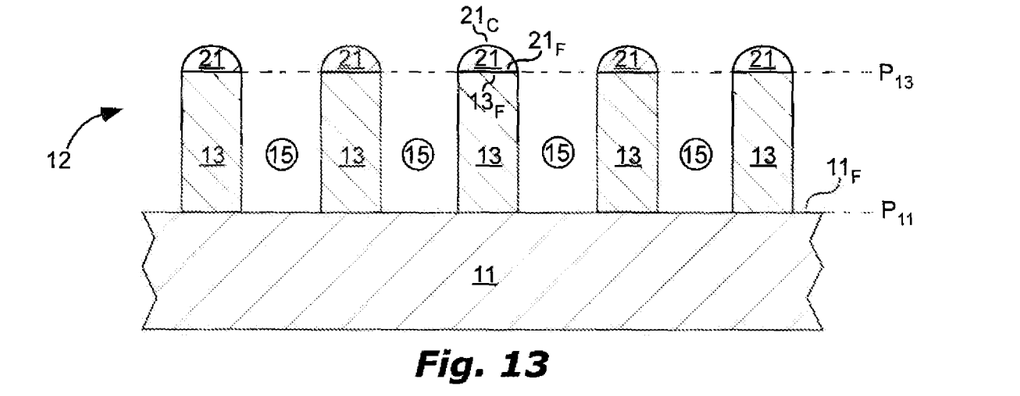
FIG. 13 is a schematic, cross-sectional side-view illustrating a step in a method of making a WGP, including using the transparent ribs 21 as a mask to etch the reflective thin film 73, forming an array of wires 12 with channels 15 between adjacent wires 12, each wire 12 including a reflective rib 13 and a transparent rib 21, and etching the transparent ribs 21, forming a curved side $21_C$ of the transparent ribs 21, while using the transparent ribs 21 as a mask, in accordance with an embodiment of the present invention.

As illustrated in FIG. 6a, for WGP performance, the transparent rib 21 can have a curved side 21$_C$ opposite of its flat side 21$_F$. As illustrated in FIG. 6b, for WGP performance, the second transparent rib 32 can have a curved side 32$_C$ opposite of its flat side 32$_F$. The curved side 21$_C$ or 32$_C$ can be shaped for WGP performance. For example, the curved side 21$_C$ or 32$_C$ can have a half elliptical shape. A major axis of the half elliptical shape can extend perpendicular to the face 11$_F$ of the substrate 11, as illustrated in FIG. 6a, or parallel to the face 11$_F$ of the substrate 11, as illustrated in FIG. 13. Examples of eccentricity of the half elliptical shape include: eccentricity $\geq 0.5$, eccentricity $\geq 0.6$, or eccentricity $\geq 0.7$; and eccentricity $\leq 0.8$, eccentricity $\leq 0.9$, or eccentricity $\leq 0.95$.

Each wire 12 of WGPs 60a or 60b can further comprise thickness Th$_R$ of the reflective rib 13; thicknesses Th$_T$ and Th$_{T2}$ of the transparent ribs 21, 31, and 32; thickness Th$_A$ of the absorptive rib 34; taper angle A of sidewalls 13$_S$ of the reflective rib 13; multiple widths $W_{13}$ of the reflective rib 13 including narrow section(s) 51 and wide section(s) 52; high aspect ratio (AR); air-filled channels; or combinations thereof, as described with other embodiments herein. The reflective rib 13 having a flat side 13$_F$, the transparent rib 21 having a curved side 21$_C$, and the second transparent rib 32 having a curved side 32$_C$, of WGPs 60a and 60b, can be applied to other WGP embodiments described herein. WGPs 60a and 60b can be useful for WGP performance, particularly high Tp and low Ts.

Reflective WGP with High Aspect Ratio

Figure 14:
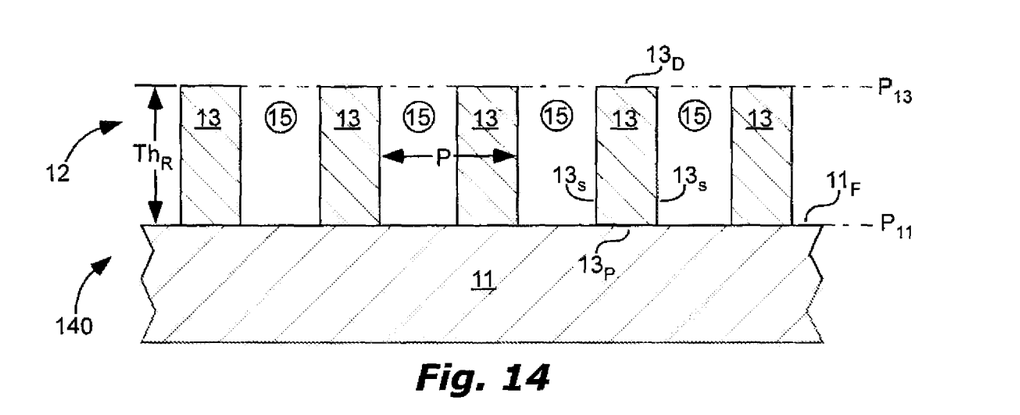
FIG. 14 is a schematic, cross-sectional side-view of a WGP 140 and also illustrating a step in a method of making a WGP, including removing the transparent ribs 21, in accordance with an embodiment of the present invention.

As illustrated in FIG. 14, WGP 140 can include an array of wires 12 similar to those described above. Each wire 12 can consist essentially of the reflective rib 13. The reflective rib 13 can have a proximal end 13$_P$ facing the substrate 11 and a distal end 13$_D$ opposite of the proximal end and farthest from the substrate 11. The distal end 13$_D$ can be flat and parallel to the face 11$_F$ of the substrate 11.

This embodiment can be manufactured as described below in the method section with the flat distal end 13$_D$, high aspect ratio (AR), and unfilled channels 15. Prior manufacturing methods were unable to achieve all three of these, and thus the prior WGPs had reduced performance. Channels 15 of WGP 140 can be air-filled. These channels 15 can be air-filled from the proximal end 13$_P$ to the distal end 13$_D$ of the wires 12. Sidewalls 13$_s$ of the wires 12, across the distal end 13$_D$ of the wires 12, or both can be exposed to air and/or covered with a conformal coating having a thickness of $\leq 1$ nm, $\leq 5$ nm, $\leq 10$ nm, $\leq 15$ nm, $\leq 20$ nm. The condition of the prior sentence can be along part of the sidewalls 13$_s$ or along the full sidewalls $13_S$ from the proximal end $13_P$ to the distal end $13_D$ of the wires 12. Following are example aspect ratios for WGP performance, and as made possible by the method described below: AR≥1.3, AR≥1.6, AR≥1.8, AR≥2.0, or AR≥2.5; and AR≤10. Aspect ratio (AR)=Th$_R$/P, where Th$_R$ equals a thickness of the reflective rib 13 measured perpendicular to the face $11_F$ of the substrate 11, and P equals a pitch of the array of wires.

The high aspect ratio and air-filled channels of WGP 140 can be applied to other WGP embodiments described herein. WGP 140 can be useful for WGP performance, particularly high Tp and low Ts.

Alternating Low and High Index Layers

Figure 15:
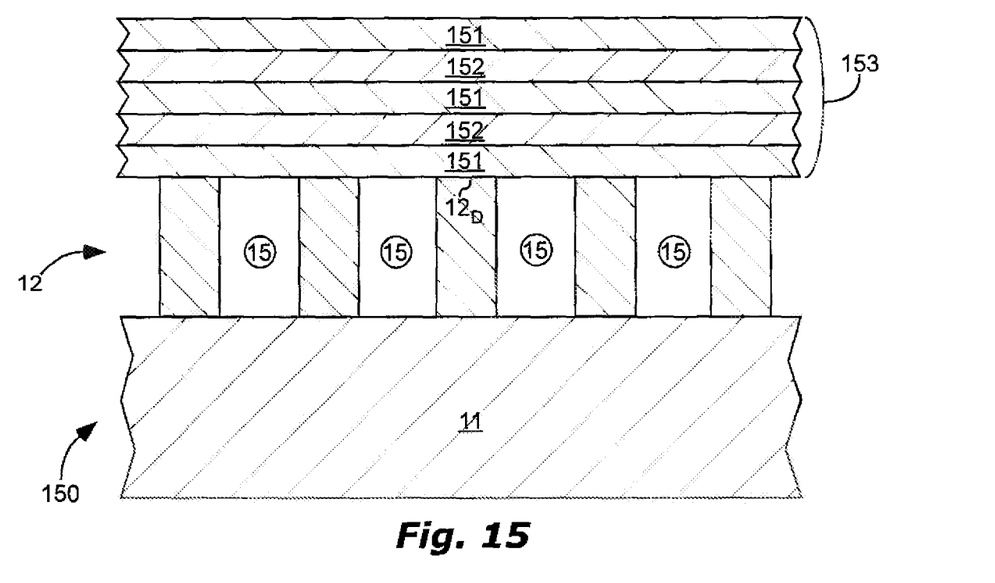
FIG. 15 is a schematic, cross-sectional side-view of a WGP 150, including an array of wires 12 on a substrate 11, with channels 15 between adjacent wires 12; a stack 153 of continuous thin films at a distal end $12_D$ of the wires 12 farthest from the substrate 11, including alternating low index layers 151 and high index layers 152, an odd number of continuous thin films, and the low index layers 151 being outermost thin films in the stack 153, in accordance with embodiments of the present invention.

As illustrated in FIG. 15, WGP 150 can include an array of wires 12 on a substrate, with channels between adjacent wires. The array of wires 12 can be similar to those described above. Thus, the design of WGP 150 can be combined with any other WGP embodiments described herein. Alternatively, the array of wires 12 can be different than those described above and can primarily absorb or reflect one polarization.

WGP 150 can also include a stack 153 of continuous thin films at a distal end $12_D$ of the wires 12 farthest from the substrate 11. The stack 153 of continuous thin films can include alternating low index layers 151 and high index layers 152. For WGP 150 performance, the stack 153 of continuous thin films can include an odd number of continuous thin films with the low index layers 151 being outermost thin films in the stack. For example, the stack 153 of continuous thin films can include 3 thin films, 5 thin films, 7 thin films or more.

Example refractive index ($n_L$) and extinction coefficient ($k_L$) of the low index layers, across the ultraviolet spectrum, across the visible spectrum, across the infrared spectrum, or combinations thereof, include: $n_L \leq 1.4$, $n_L \leq 1.5$, $n_L \leq 1.6$, or $n_L \leq 1.7$; and $k_L \leq 0.001$, $k_L \leq 0.01$, or $k_L \leq 0.1$. Example refractive index ($n_H$) and extinction coefficient ($k_H$) of the high index layers, across the ultraviolet spectrum, across the visible spectrum, across the infrared spectrum, or combinations thereof, include: $n_H \geq 2.0$, $n_H \geq 2.1$, $n_H \geq 2.2$, $n_H \geq 2.3$, or $n_H \geq 2.4$; and $k_H \leq 0.001$, $k_H \leq 0.01$, or $k_H \leq 0.1$.

The low index layers 151 can comprise silicon dioxide, such as for example ≥80 mass percent, ≥90 mass percent, ≥95 mass percent, or ≥99 mass percent silicon dioxide. The high index layers 152 can comprise niobium pentoxide, such as for example ≥80 mass percent, ≥90 mass percent, ≥95 mass percent, or ≥99 mass percent niobium pentoxide.

General Information for all Embodiments

A choice among the above embodiments can depend on overall WGP design and can relate to materials used and thicknesses of the layers. Any of the above WGP characteristics can be merged in any combination. Such combinations, including merging characteristics for low Rp with characteristics for high Tp/low Ts, can result in optimal overall WGP performance. Each WGP design for each specific application may have its own unique combination of such characteristics. The following characteristics, however, are particularly applicable to any of the WGP embodiments described herein.

The inventions described herein can be optimized for WGP performance. The embodiments of FIGS. 1, 3, and 4 can be particularly helpful for low Rp. The embodiments of FIGS. 5a-6b and 14 can be particularly helpful for high Tp and low Ts. Examples of performance for the WGPs described herein include: Rp≤0.05%, Rp≤0.1%, Rp≤0.2%, or Rp≤0.5%; Rs≥80%, Rs≥85%, Rs≥90%, or Rs≥95%; Tp≥85%, Tp≥88%, or Tp≥91%; Ts≤0.01, Ts≤0.04, Ts≤0.08, or Ts≤0.12; each at a wavelength of 450 nm, 550 nm, or 650 nm, or across a wavelength range from 450 nm through 700 nm. Rp is a percent reflection and Tp is a percent transmission of a primarily transmitted polarization. Rs is a percent reflection and Ts is a percent transmission of a primarily reflected polarization.

Figure 2:
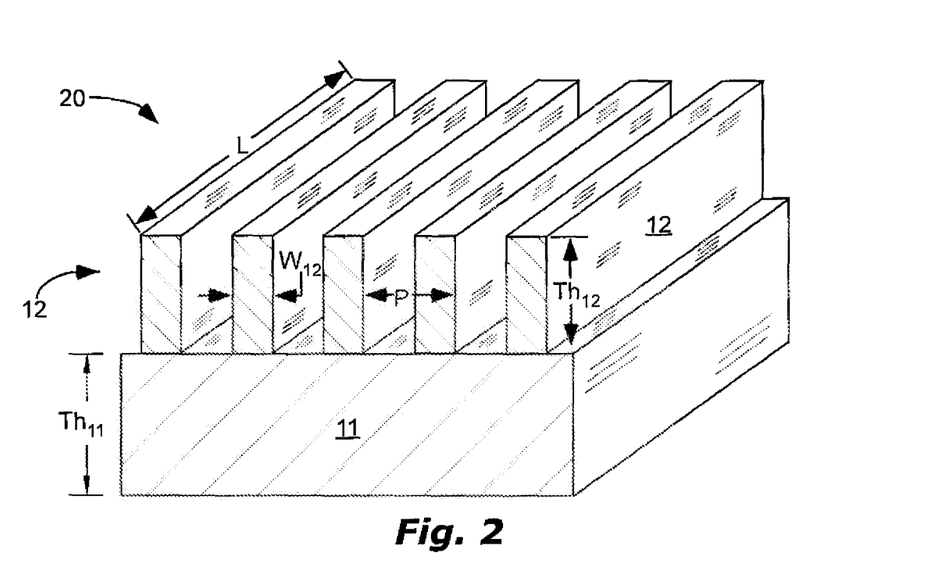
FIG. 2 is a schematic perspective-view of a WGP 20 in accordance with an embodiment of the present invention.

FIG. 2 is a schematic perspective-view of WGP 20, illustrating a relationship between pitch P of the array of wires 12, wire width $W_{12}$, wire thickness $Th_{12}$, and wire length L. These relationships and this structure can be applied to any of the embodiments described herein.

The transparent ribs 21, 31, and 32 can have k≤0.1; the absorptive rib 34 can have k>0.1 and R≤0.6; and the reflective rib 13 can have k>0.1 and R>0.6; each in a specified wavelength range, such as for example across the visible spectrum, across the infrared spectrum, across the ultraviolet spectrum, or combinations thereof, as further described in the definitions section.

For WGP performance of any WGP embodiments described herein, the transparent ribs 21, 31, and 32 can have a relatively large real part of the refractive index (n), a relatively low extinction coefficient (k), or both. For example, across a wavelength range from 400 nm through 700 nm, n≥1.7, n≥2.0, n≥2.1, or n≥2.3; and k≤0.1, k≤0.01, or k≤0.001, independently, for each of the transparent ribs 21, 31, and 32. The n and k values of this paragraph, combined with other WGP characteristics described herein, can be particularly useful for low Rp, high Tp, low Ts, or combinations thereof.

Following are example materials for layers of the wires 12, for any of the WGP embodiments described herein. The transparent rib 21, the first transparent rib 31, the second transparent rib 32, or combinations thereof can comprise silicon dioxide, titanium dioxide, aluminum oxide, hafnium oxide, or combinations thereof. The absorptive rib 34 can include silicon, germanium, or both. The reflective rib 13 can comprise aluminum. Different materials may be selected for different WGP designs, depending on whether improving Tp, Ts, Tp/Ts, Rp, or Rs is the primary objective.

Method

A method of making a WGP can comprise some or all of the following steps, which can be performed in the following order or other order if so specified. Some of the steps can be performed simultaneously unless explicitly noted otherwise in the claims. There may be additional steps not described below. These additional steps may be before, between, or after those described. Components of the WGP, and the WGP itself, can have properties as described above.

Figure 7:
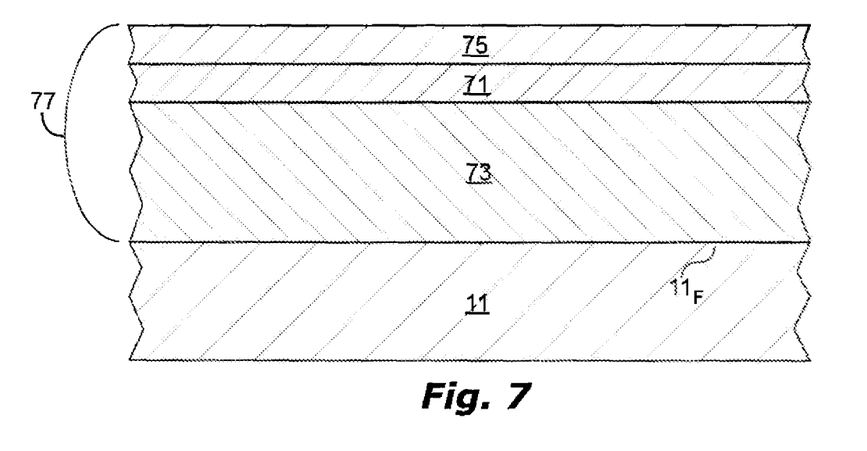
FIGS. 7-8 are schematic cross-sectional side-views illustrating steps in a method of making a WGP, including providing a substrate 11 with the following thin films 77 on a face $11_F$ of the substrate 11 in the following order from closest to the substrate 11 to farthest from the substrate 11: a reflective thin film 73, a transparent thin film 71, then a resist thin film 75 (FIG. 7); and patterning and etching the resist thin film 75 to form an array of resist ribs 85 (FIG. 8); in accordance with an embodiment of the present invention.
Figure 8:
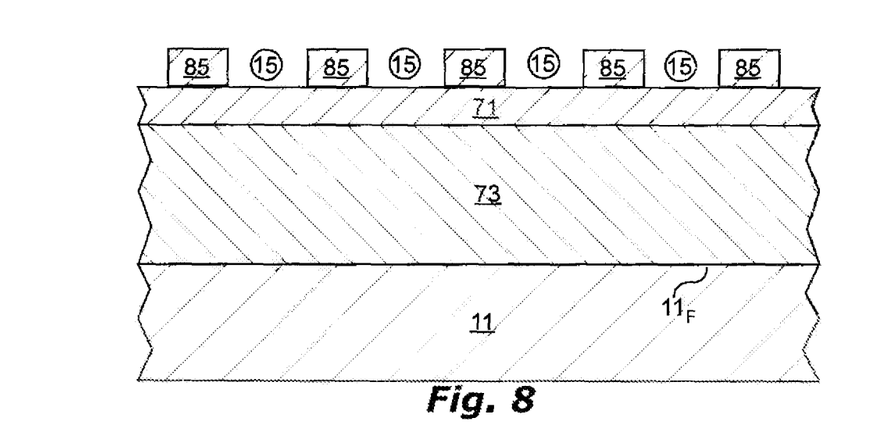

The method can comprise:

(A1) Step A1 can include providing a substrate 11 with the following thin films 77 on a face $11_F$ of the substrate 11 in the following order from closest to the substrate 11 to farthest from the substrate 11: a reflective thin film 73, a transparent thin film 71, then a resist thin film 75 (FIG. 7). There may be additional thin films not listed. Step A1 can also include patterning and etching the resist thin film 75 to form an array of resist ribs 85 with channels 15 between adjacent resist ribs 85 (FIG. 8).

Figure 9:
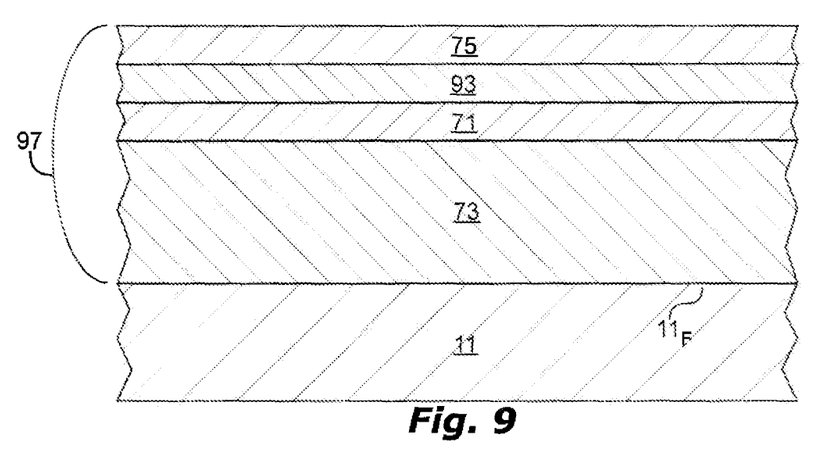
FIGS. 9-11 are schematic, cross-sectional side-views illustrating steps in a method of making a WGP, as an alternative to the steps shown in FIGS. 7-8, including providing a substrate 11 with the following thin films 97 on a face $11_F$ of the substrate 11 in the following order from closest to the substrate 11 to farthest from the substrate 11: a reflective thin film 73, a transparent thin film 71, a second reflective thin film 93, then a resist thin film 75, (FIG. 9); patterning and etching the resist thin film 75 to form an array of resist ribs 85 (FIG. 10); and etching the second reflective thin film 93 to form a top array of reflective ribs 103 (FIG. 11); in accordance with an embodiment of the present invention.
Figure 10:
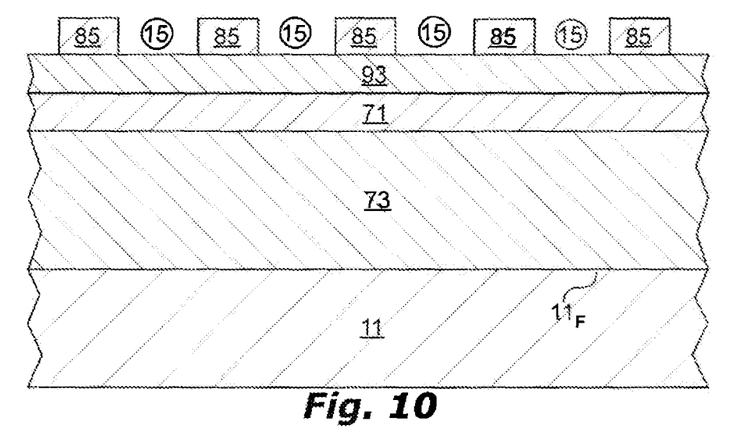
Figure 11:
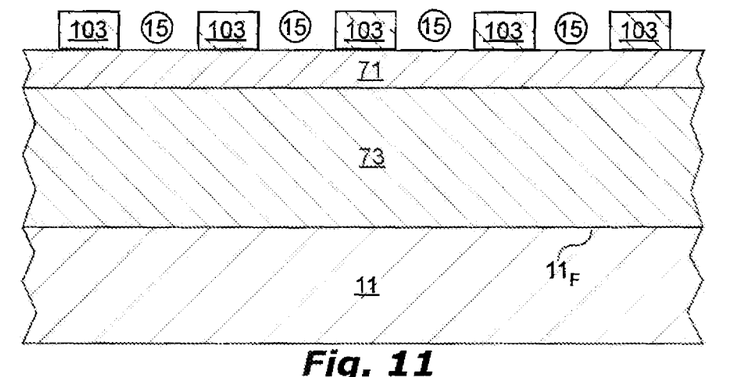

(A2) An alternative to step A1 is illustrated in FIGS. 9-11 and is described in this step A2. Step A2 can include providing a substrate 11 with the following thin films 97 on a face $11_F$ of the substrate 11 in the following order from closest to the substrate 11 to farthest from the substrate 11: a reflective thin film 73, a transparent thin film 71, a second reflective thin film 93, then a resist thin film 75, (FIG. 9). There may be additional thin films not listed. Step A2 can also include patterning and etching the resist thin film 75 to form an array of resist ribs 85 with channels 15 between adjacent resist ribs 85 (FIG. 10). Step A2 can further include etching the second reflective thin film 93 to form a top array of reflective ribs 103 with channels 15 between adjacent reflective ribs 103 of the top array (FIG. 11). The array of resist ribs 85 can be used as a mask to etch the second reflective thin film 93.

Figure 12:
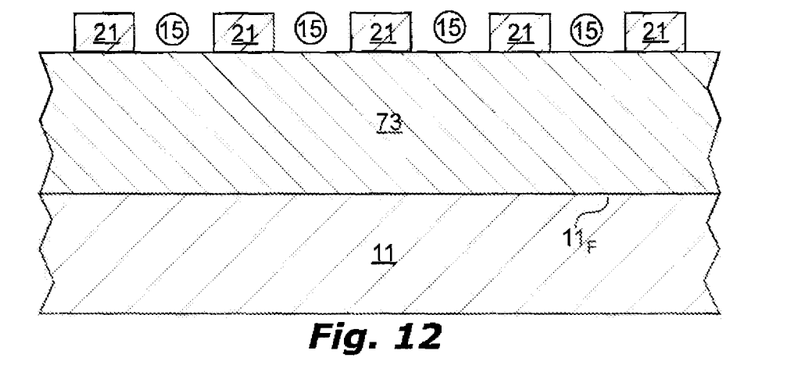
FIG. 12 is a schematic, cross-sectional side-view illustrating a step in a method of making a WGP, which can follow the step illustrated in FIG. 8 or in FIG. 11, including etching the transparent thin film 71 to form an array of transparent ribs 21, in accordance with an embodiment of the present invention.

(B) Step B can follow steps A1 or steps A2. Step B can include etching the transparent thin film 71 to form an array of transparent ribs 21 with channels 15 between adjacent transparent ribs 21. The array of resist ribs 85 (if following step A1) or the top array of reflective ribs 103 (if following step A2) can be used as a mask to etch the transparent thin film 71. See FIG. 12.

(C) Step C can follow step B. Step C can include using the transparent ribs 21 as a mask to etch the reflective thin film 73, forming an array of wires 12 with channels 15 between adjacent wires 12, each wire 12 including a reflective rib 13 and a transparent rib 21, and etching the transparent ribs 21, forming a curved side $21_C$ of the transparent ribs 21, while using the transparent ribs 21 as a mask. See FIG. 13. Using argon during a later part of the etch of the transparent ribs 21 can help form the curved side $21_C$ of the transparent rib 21.

(D) Step D can follow step C. Step D can include removing the transparent ribs 21. Chlorine can be used to remove any remaining resist ribs 85. Boron trichloride, fluorine, chlorine, or combinations thereof can be used for removal of the transparent rib 21. The transparent rib 21, particularly with the curved side $21_C$, can improve performance at certain angles of incidence, but performance at other angles can be better with the transparent rib 21 removed.

The reflective thin film 73 and the second reflective thin film 93 can have a same material composition with respect to each other. This can allow easier etching of the reflective thin film 73. For example, the reflective thin film 73 and the second reflective thin film 93 can both comprise aluminum, such as ≥10% Al, ≥50% Al, ≥80% Al, or ≥95% Al.

What is claimed is:

1. A reflective wire grid polarizer (WGP) comprising:
an array of wires on a face of a substrate, with channels between adjacent wires;
each wire including a reflective rib and a transparent rib, the reflective rib sandwiched between the transparent rib and the substrate;
the transparent rib having a real part of a refractive index ≥1.7 and an extinction coefficient ≤0.1, across a wavelength range from 400 nm through 700 nm:
the reflective rib having a thickness ($Th_R$), measured perpendicular to the face of the substrate, within the following range: 100 nm≤$Th_R$≤125 nm;
the transparent rib having a thickness ($Th_R$), measured perpendicular to the face of the substrate, within the following range: 7 nm≤$Th_T$≤40 nm;
the array of wires having a duty cycle (DC) within the following range: 0.39≤DC≤0.49, where DC equals wire width divided by pitch of the array of wires, both pitch and width measured at a midpoint between an end of the wires closest to the substrate and an end of the wires farthest from the substrate;
the reflective rib has a flat side facing the transparent rib and parallel to the face of the substrate and the transparent rib has a curved side opposite of the reflective rib; and
the curved side of the transparent rib has a half elliptical shape with a major axis of the half elliptical shape extending perpendicular to the face of the substrate and an eccentricity ≥0.6 and ≤0.9.

2. The WGP of claim 1, wherein the WGP has the following performance characteristics: Rp ≤0.2% and Rs ≥80% across a wavelength range from 450 nm through 700 nm, where Rp is a percent reflection of a primarily transmitted polarization and Rs is a percent reflection of a primarily reflected polarization.

3. A reflective wire grid polarizer (WGP) comprising:
an array of wires on a face of a substrate, with channels between adjacent wires;
each wire including a reflective rib an a transparent rib, the reflective rib sandwiched between the transparent rib and the substrate;
the transparent rib having a real part of a refractive index ≤1.7 and an extinction coefficient ≤0.1, across a wavelength range from 400 nm through 700 nm;
the reflective rib having a thickness ($Th_R$), measured perpendicular to the face of the substrate, within the following range: 100 nm ≤$Th_R$≤125 nm;
the transparent rib having a thickness ($Th_T$), measured perpendicular to the face of the substrate, within the following range: 7 nm ≤$Th_T$≤40 nm; and,
the array of wires having a duty cycle (DC) within the following range: 0.39≤DC≤0.49, where DC equals wire width divided by pitch of the array of wires, both pitch and width measured at a midpoint between an end of the wires closest to the substrate and an end of the wires farthest from the substrate;
each reflective rib is wider at a distal end farthest from the substrate than at a proximal end closest to the substrate; and
a taper angle of sidewalls of the reflective rib, relative to a plane perpendicular to the face of a substrate and parallel with the array of wires, is within the following range: 1°≤taper angle 4°.

4. The WGP of claim 3, further comprising:
a stack of continuous thin films at a distal end of the wires farthest from the substrate;
the stack of continuous thin films including alternating low index layers and high index layers;
the stack of continuous thin films including an odd number of continuous thin films with the low index layers being outermost thin films in the stack;
the stack of continuous thin films including 5 thin films;
the low index layers comprise silicon dioxide and the high index layers comprise niobium pentoxide; and
the high index layers having the following refractive index ($n_H$) and extinction coefficient ($k_H$) across the ultraviolet spectrum, across the visible spectrum, or both: $n_H$≤2.2 and $k_H$≤0.1.

5. The WGP of claim 3, wherein the WGP has the following performance characteristics: Rp ≤0.2% and Rs ≥80% across a wavelength range from 450 nm through 700 nm, where Rp is a percent reflection of a primarily transmitted polarization and Rs is a percent reflection of a primarily reflected polarization.

6. A reflective wire grid polarizer (WGP) comprising:
an array of wires on a face of a substrate, with channels between adjacent wires;
each wire including a reflective rib and a transparent rib, the reflective rib sandwiched between the transparent rib and the substrate;
the transparent rib having a real part of a refractive index ≥1.7 and an extinction coefficient ≤0.1, across a wavelength range from 400 nm through 700 nm;

the reflective rib having a thickness ($Th_R$), measured perpendicular to the face of the substrate, within the following range: 100 nm ≤$Th_R$≤25 nm;

the transparent rib having a thickness ($Th_T$), measured perpendicular to the face of the substrate, within the following range: 7 nm ≤$Th_T$≤40 nm; and the array of wires having a duty cycle (DC) within the following range: 0.39≤DC≤0.49, where DC equals wire width divided by pitch of the array of wires, both pitch and width measured at a midpoint between an end of the wires closest to the substrate and an end of the wires farthest from the substrates; and the WGP has the following performance characteristics: Rp ≤0.2% and Rs ≥80% across a wavelength range from 450 nm through 700 nm, where Rp is a percent reflection of a primarily transmitted polarization and Rs is a percent reflection of a primarily reflected polarization.

7. The WGP of claim 6, wherein the reflective rib has a flat side facing the transparent rib and parallel to the face of the substrate and the transparent rib has a curved side opposite of the reflective rib.

8. The WGP of claim 6, wherein the real part of the refractive index is ≥2.0 and the extinction coefficient is ≤0.01.

9. The WGP of claim 6, wherein the transparent rib comprises titanium dioxide.

10. The WGP of claim 6, wherein:
107 nm≤$Th_R$≤117 nm;
11 nm≤$Th_T$≤17 nm; and
0.42≤DC≤0.46.

11. The WGP of claim 6, wherein the reflective rib adjoins the transparent rib and the substrate.

12. The WGP of claim 6, wherein each wire consists essentially of the reflective rib and the transparent rib.

13. The WGP of claim 6, wherein a surface of the transparent rib not facing the reflective rib is exposed to air, is covered by a material having a thickness of ≤15 nm, or both.

14. The WGP of claim 6, wherein the reflective rib has multiple widths, including a narrow section and a wide section.

15. The WGP of claim 6, wherein the array of wires have an aspect ratio (AR) of ≥1.8, where AR=$Th_R$/P, $Th_R$ is a thickness of the wires measured perpendicular to the face of the substrate, and P is a pitch of the array of wires.

16. The WGP of claim 6, further comprising:
a stack of continuous thin films at a distal end of the wires farthest from the substrate;
the stack of continuous thin films including alternating low index layers and high index layers;
the stack of continuous thin films including an odd number of continuous thin films with the low index layers being outermost thin films in the stack;
the stack of continuous thin films including 5 thin films;
the low index layers comprise silicon dioxide and the high index layers comprise niobium pentoxide; and
the high index layers having the following refractive index ($n_H$) and extinction coefficient ($k_H$) across the ultraviolet spectrum, across the visible spectrum, or both: $n_H$≥2.2 and $k_H$≤0.1.

17. A reflective wire grid polarizer (WGP) comprising:
an array of wires on a face of a substrate, with channels between adjacent wires;
each wire including the following layers in the following order from closest to the substrate to farthest from the substrate: a reflective rib, a first transparent rib, an absorptive rib, and a second transparent rib;
the first transparent rib and the second transparent rib each having a real part of the refractive index ≥1.7 and an extinction coefficient ≤0.1, both across a wavelength range from 400 nm through 700 nm;
the reflective rib having a thickness ($Th_R$), measured perpendicular to the face of the substrate, within the following range: 95 nm≤$Th_R$≤155 nm;
the first transparent rib having a thickness ($Th_T$), measured perpendicular to the face of the substrate, within the following range: 0.1 nm≤$Th_T$≤3 nm;
the absorptive rib having a thickness ($Th_A$), measured perpendicular to the face of the substrate, within the following range: 0.5 nm≤$Th_A$≤4 nm;
the second transparent rib having a thickness ($Th_{T2}$), measured perpendicular to the face of the substrate, within the following range: 6 nm≤$Th_{T2}$≤20 nm; and
the array of wires having a duty cycle (DC) within the following range: 0.41≤DC≤0.48, where DC equals wire width divided by pitch of the array of wires, both pitch and width measured at a midpoint between an end of the wires closest to the substrate and an end of the wires farthest from the substrate.

18. The WGP of claim 17, wherein:
the first transparent rib and the second transparent rib each independently comprise titanium dioxide, aluminum oxide, hafnium oxide, or combinations thereof; and
the absorptive rib comprises silicon, germanium, or both.

19. The WGP of claim 17, wherein:
114 nm≤$Th_R$≤136 nm;
0.5 nm≤$Th_T$≤2 nm;
1 nm≤$Th_A$≤3 nm;
7 nm≤$Th_{T2}$≤15 nm; and
0.43≤DC≤0.46.

20. The WGP of claim 17, wherein each wire consists essentially of the reflective rib, the first transparent rib, the absorptive rib, and the second transparent rib.

* * * * *